(12) United States Patent
Guering

(10) Patent No.: US 9,944,380 B2
(45) Date of Patent: Apr. 17, 2018

(54) ACCESS DEVICE PROVIDED WITH INDEPENDENT MOBILE WALLS ENABLING SECURE COMMUNICATION BETWEEN AT LEAST TWO ZONES OF AN ENCLOSURE

(71) Applicant: Airbus Operations S.A.S., Toulouse (FR)

(72) Inventor: Bernard Guering, Montrabe (FR)

(73) Assignee: Airbus Operations S.A.S. (FR)

( * ) Notice: Subject to any disclaimer, the term of this patent is extended or adjusted under 35 U.S.C. 154(b) by 165 days.

(21) Appl. No.: 15/150,507

(22) Filed: May 10, 2016

(65) Prior Publication Data
US 2016/0332717 A1 Nov. 17, 2016

(30) Foreign Application Priority Data
May 12, 2015 (FR) ...................................... 15 54238

(51) Int. Cl.
*B64D 11/00* (2006.01)
*B64C 1/14* (2006.01)
*B64D 45/00* (2006.01)

(52) U.S. Cl.
CPC .......... *B64C 1/1407* (2013.01); *B64C 1/1438* (2013.01); *B64C 1/1469* (2013.01); *B64D 11/00* (2013.01); *B64D 11/0023* (2013.01); *B64D 45/0015* (2013.01); *B64D 2011/0046* (2013.01)

(58) Field of Classification Search
CPC ......... E06B 3/90; E06B 3/903; B64C 1/1407; B64C 1/1423; B64C 1/1438; B64C 1/1469
See application file for complete search history.

(56) References Cited

U.S. PATENT DOCUMENTS

| 3,658,277 | A | 4/1972 | Anderson |
| 6,375,562 | B1 | 4/2002 | Hein |
| 6,601,797 | B2 * | 8/2003 | Sheremeta ............ B64C 1/1469 244/118.5 |
| 8,925,863 | B2 | 1/2015 | Pujol et al. |

(Continued)

FOREIGN PATENT DOCUMENTS

| EP | 2 727 823 A2 | 5/2014 |
| FR | 2 965 793 A1 | 4/2012 |

(Continued)

OTHER PUBLICATIONS

Search Report FR 1554238 dated Dec. 17, 2015.
Search Report FR 1554248 dated Dec. 17, 2015.

*Primary Examiner* — Richard G Davis
(74) *Attorney, Agent, or Firm* — Lerner, David, Littenberg, Krumholz & Mentlik, LLP

(57) ABSTRACT

An access device enables controlled or secure communication between different areas of an enclosure and, in the example illustrated in the present application of an aircraft, while providing reduced size. The access device includes at least three mobile walls able to move, independently from one another, to form a closed cylinder, the walls thus being in a so-called security vestibule position, and to overlap at least in twos in order to close off access to one or more areas while concealing the security vestibule, the walls thus being in a so-called retracted position. By overlapping at the access level of said areas that the walls allow to close, the device frees up the adjoining cabin space.

10 Claims, 5 Drawing Sheets

(56) References Cited

U.S. PATENT DOCUMENTS

| | | | |
|---|---|---|---|
| 9,079,666 B2* | 7/2015 | Guering | B64C 1/1469 |
| 2006/0032977 A1* | 2/2006 | Simmons | B64C 1/1469 244/118.5 |

FOREIGN PATENT DOCUMENTS

| | | |
|---|---|---|
| NL | 1 019 944 C2 | 8/2003 |
| WO | 03/057563 A1 | 7/2003 |
| WO | 2011/055097 A2 | 5/2011 |
| WO | 2012/045931 A1 | 4/2012 |

* cited by examiner

ACCESS DEVICE PROVIDED WITH INDEPENDENT MOBILE WALLS ENABLING SECURE COMMUNICATION BETWEEN AT LEAST TWO ZONES OF AN ENCLOSURE

FIELD OF THE INVENTION

The present invention relates to an access device enabling controlled or secure communication between different areas of an enclosure and, for example, an aircraft. More particularly, the device notably enables cockpit access to be protected from the cabin. The present invention also relates to the aircraft equipped with such an access device.

BACKGROUND OF THE INVENTION

In today's aircraft, the cockpit is separated from the cabin by a reinforced separating partition provided with an access door. The door can be locked from inside the cockpit to prevent all aggressions from the cabin. The cabin can have different types of layouts near the cockpit:

Toilet facilities adjoining the separating partition between the cabin and cockpit and positioned on one side of the door of said partition;

Toilet and kitchen facilities adjoining the separating partition between the cabin and cockpit and positioned on either side of the door of said partition in a direction transverse to the aircraft;

Passenger seats placed in close proximity to the separating partition between the cabin and cockpit.

Very few aircraft have toilet facilities dedicated solely to pilots. Pilots must exit the cockpit to use the toilet facilities intended for passengers. Pilots may also want to access the cabin, for example, to check the status of an aircraft system. The crew of an aircraft may also need to access the cockpit for example to serve the pilots meals. However, using the access door exposes the pilots to aggressions from the cabin.

A configuration exists providing toilet and kitchen facilities adjoining the cockpit and arranged on either side of the cockpit access door. In this case, the toilet and kitchen facilities form an aisle providing protection to the cockpit access. However, in other configurations, an additional protection system must be provided such as a security vestibule.

Protecting the access to the cockpit by a security vestibule formed by mobile walls able to move independently from one another so as to provide a single opening therebetween which makes it possible to access the cockpit or the cabin is known from patent FR2965793, filed on Oct. 8, 2010. This device has the drawback of occupying a significant volume in the cabin, particularly in the configurations wherein the seats are near the partition separating the cockpit from the cabin. For passenger comfort, a minimum perimeter is required to access the security vestibule thus taking up cabin space for the passenger seats.

BRIEF SUMMARY OF THE INVENTION

To do this, aspects of the present invention proposes an access device enabling secure communication between at least two areas of an enclosure, wherein it comprises at least three mobile walls able to move, independently from one another, to form a closed cylinder, the walls thus being in a so-called security vestibule position, and to overlap at least in twos in order to close off access to one or more areas while concealing the security vestibule, the walls thus being in a so-called retracted position.

As the access device in the form of a security vestibule is retractable by overlapping the walls thereof at the openings for which access must be managed, it avoids cluttering up the cabin space adjoining said openings.

The invention has at least one of the following optional features, taken alone or in combination.

Each wall is made of a single piece.

Each wall has an apertured circular cylindrical shape and the walls are positioned in a concentric manner about a common axis.

The device comprises four apertured cylindrical walls forming a shutter, walls of circular cross-section concentric about a common axis such as in the security vestibule position, the shutters together form a closed circular cylinder and in another retracted position, they overlap at least in twos.

Each wall is connected to retaining and rotational movement means independent from those provided for each other wall.

Each wall has two cylindrical rings to stiffen its structure and form the link with the retaining and movement means.

The retaining and movement means of each of the walls are such that they do not protrude in relation to a floor.

The present invention also relates to an aircraft comprising at least one access device having the characteristic(s) above.

The aircraft comprises at least two areas provided with access openings able to be closed by the walls of the access device.

One of these areas is the cockpit, and another of these areas is the cabin; the walls overlap to form a cockpit closure shutter and completely free up the cabin.

The toilet facilities are another one of these areas; the walls are able to simultaneously close off access to the toilet facilities and the cockpit while completely freeing up the cabin.

BRIEF DESCRIPTION OF THE DRAWINGS

Other purposes, advantages and characteristics of the invention will become apparent upon reading the following description of the device according to the invention, given by way of non-limiting example in reference to the accompanying drawings wherein.

DETAILED DESCRIPTION

As shown in FIGS. 1 to 6, the access device 1 is presented in the following description in the illustrative and non-limiting framework of the access to a cockpit 2 in an aircraft 4. The access device can be used in any other application requiring secure access to several adjoining areas of an enclosure and completely free up the space taken by the access device in certain areas when no access or only unsecured access to them is required.

Figure 1:
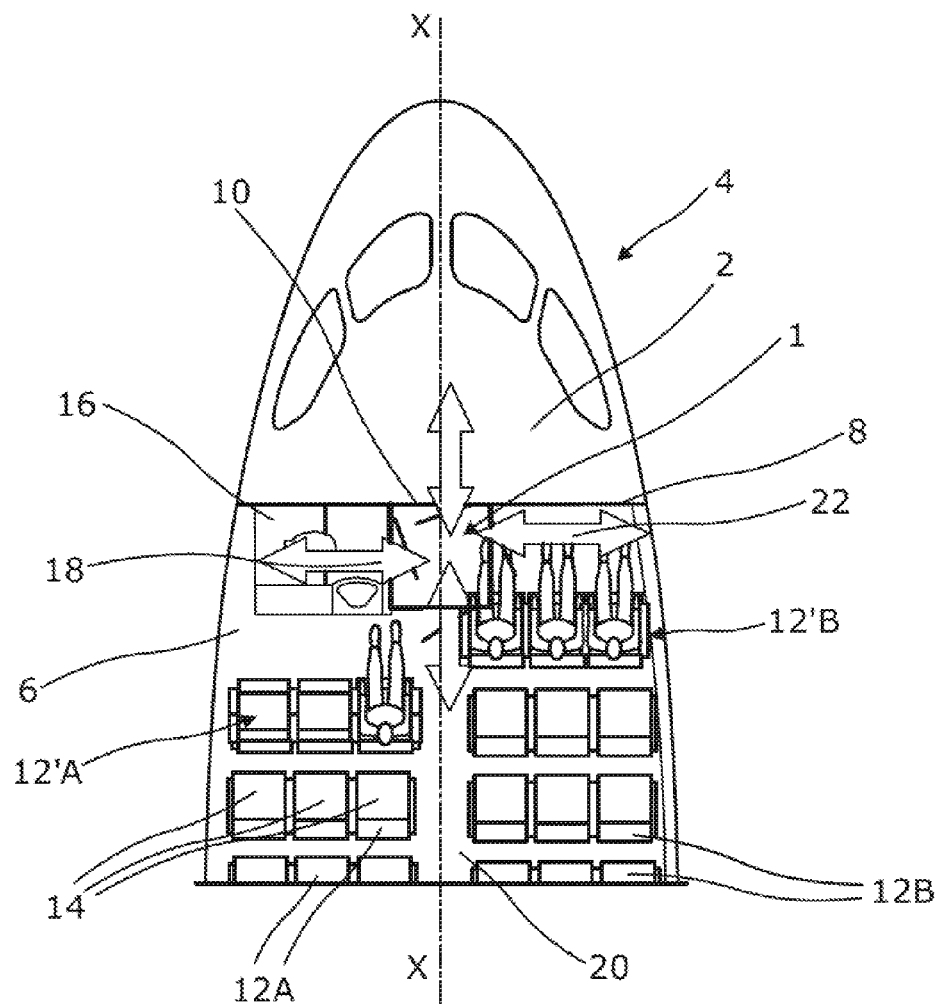
FIG. 1 is a schematic top plan view of a front part of an aircraft which is not equipped with the access device according to an embodiment of the present invention.
Figure 2:
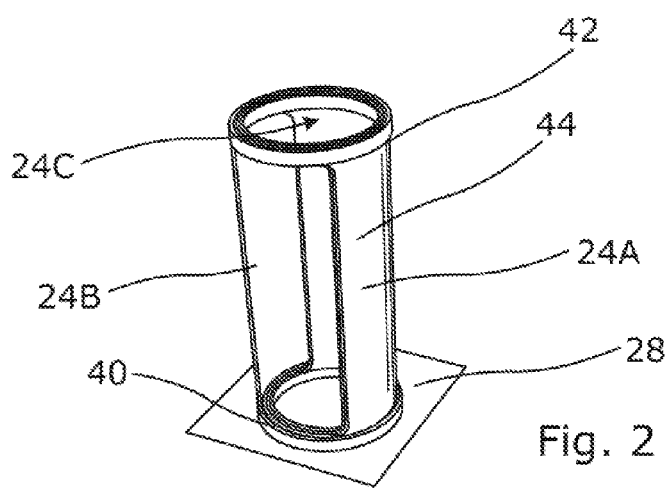
FIG. 2 is a perspective view of an embodiment of the access device according to the present invention.
Figure 3:
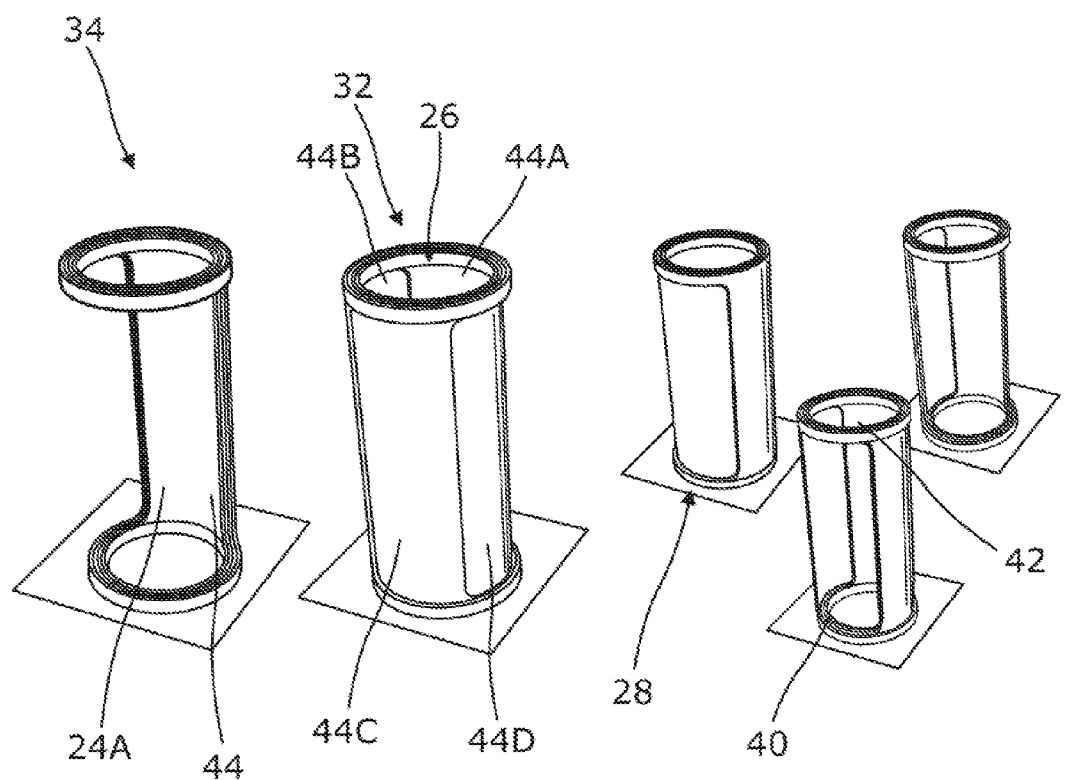
FIG. 3 is a perspective view of the access device according to the shape illustrated in FIG. 2 in several positions of use.
Figure 4:
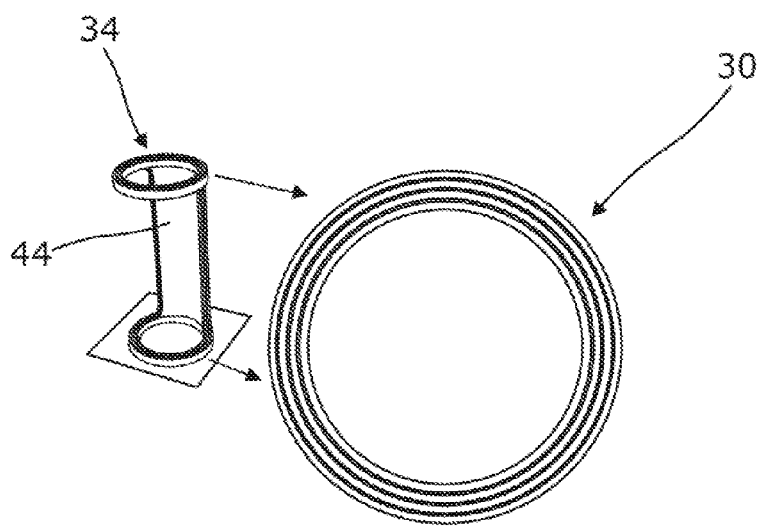
FIG. 4 schematically illustrates the guide tracks of the access device according to the embodiment of FIGS. 2 and 3 represented in perspective.

Generally speaking and as represented in FIG. 1, the cockpit 2 is separated from a cabin 6 by a partition 8. The partition 8 has an opening 10 allowing passage between the cockpit and cabin for the pilots, flight attendants, crew and others. The cabin 6 comprises an area provided with rows 12 of seats 14 arranged transversely to the longitudinal axis X-X of the aircraft 4, the toilet facilities 16, galleys, rest areas, storage areas or any other type of area according to a variety of layouts. The purpose of the access device 1 is to be incorporated into the aircraft in order to perform the abovementioned function between the cabin areas and the cockpit, itself forming an area.

In the embodiment illustrated in FIG. 1 and representing a particular cabin configuration, the cabin 6 comprises toilet facilities 16 adjoining the partition 8 and provided with an opening 18 providing a passage between the toilet facilities 16 and the cabin 6. Rows 12 of seats continue up to the partition 8 and up to the toilet facilities 16. A center aisle 20 separates the rows of seats 12A located transversely on the side of the toilet facilities 16 and the rows of seats 12B located on the other side. Only certain seats of rows 12A' and 12B' closest to the toilet facilities 16 and the partition 8, respectively, are represented as occupied by a passenger in order to highlight the space to be provided for the legs of passengers. The access device 1 is integrated into the configuration illustrated to manage access between various areas of said illustrated configuration, namely a first area formed by the cockpit 2, a second area formed by the toilet facilities 16 and a third area formed by the passenger cabin area in which the rows 12 of seats 14 are aligned. In FIG. 1, the required access points are shown by two-headed arrows: an access to the cockpit 2, an access to the toilet facilities 16, an access to the cabin 6 and more precisely to a longitudinal aisle 20 and a transversal aisle 22 of the cabin 6.

FIG. 1 shows the size of a conventional security vestibule that would require removing the passenger seats 12 closest to it.

The access device 1 is located on the longitudinal axis X-X along the continuation of the center aisle 20 and along a transverse axis passing through the toilet facilities 16 and the transverse aisle 22 located between the partition 8 and the row 12'B of seats. It is thus positioned more generally at the intersection of adjoining areas for which access management is desired while keeping the space unobstructed when such management is not required.

The access device 5 comprises at least three mobile walls 24A, 24B, 24C able to move independently from one another along closed and concentric trajectories. At least part of one or several walls 24 is able to close the openings 10 and/or 18: this part is referred to as the shutter in the remainder of the description. The geometry of the shutters of the walls 24 is determined so that when placed adjacent to one another, they form a closed cylindrical surface (surface 26 in FIG. 3). The closed volume bounded by said closed cylindrical surface, the floor 28 and the ceiling (not represented) of the aircraft cabin 6 form the interior volume of said access device 1. Each of the walls 24 is able to move along guide tracks 30 provided in the floor and ceiling of the cabin and represented in FIG. 4. The tracks 30 can for example be in the form of grooves in which the walls 24 are inserted and move. The grooves 30 provided for each of the walls are concentric. According to the embodiment illustrated, the cylindrical surface 28 has a circular cross-section; the grooves 30 are thus circular in shape. In the latter case, the walls move around one and the same vertical axis located in the center of the circular grooves 30. The shape and size of the shutters of the walls 24 are such that they can be arranged in relation to one another to form a closed cylinder and according to the shape illustrated in FIG. 3, a cylinder 26 with a circular cross-section.

According to a particular embodiment such as that illustrated, the walls 24 are nearly identical in shape and size (they are slightly different as they are positioned on separate guide tracks). In this manner, when the walls are moved along the corresponding groove 30 to be placed behind one another, they overlap thus leaving the previously occupied space free. Whether there are three, four or more walls 24, they can be moved independently from one another. The shutters of the walls 24 are able to be positioned adjacent to one another so as to form a closed cylinder 26 used in a position referred to as the security vestibule position 32 and to overlap at least in twos to close off the access to one or two areas while concealing the security vestibule, in a position of use referred to as the retracted position 34. The size of the walls 24 and notably the shutters and, consequently, the size of the guide tracks 30 is a function of the width of the openings enabling passage between the various areas for which access control is desired. At least one of the shutters of the walls 24 must be adapted to the opening width that it is intended to conceal. Thus, for example, in the case where two passages are managed for access, the widths of at least two of the shutters are adapted to the width of the opening that each of them is intended to close.

When the access device 1 is in the security vestibule position, neighboring shutters, i.e. those in neighboring concentric guide tracks, must adjoin in twos. Thus, no space is freed up between the shutters as they are located on different guide tracks except between one of the edges of the shutter of the outside wall (on the most exterior guide track) and one of the edges of the shutter of the interior wall (on the most interior guide track). A wall 36 is thus provided to close off the free space owing to the positioning on non-neighboring guide tracks (the most exterior guide track and the most interior guide track). The wall 36 is more clearly visible in FIG. 6d. The wall 36 is parallelepiped in shape and rectangular in the example illustrated. It is positioned so that in closed security vestibule position, one of its edges adjoins the shutter of the interior wall and the other of its edges adjoins the shutter of the outside wall.

In the case where the closed cylindrical surface 28 is of circular cross-section, each of the walls 24 is rotatably mobile around a central longitudinal axis of said cylindrical surface 28. The closure wall 36 is thus positioned in a radial direction.

Figure 5:
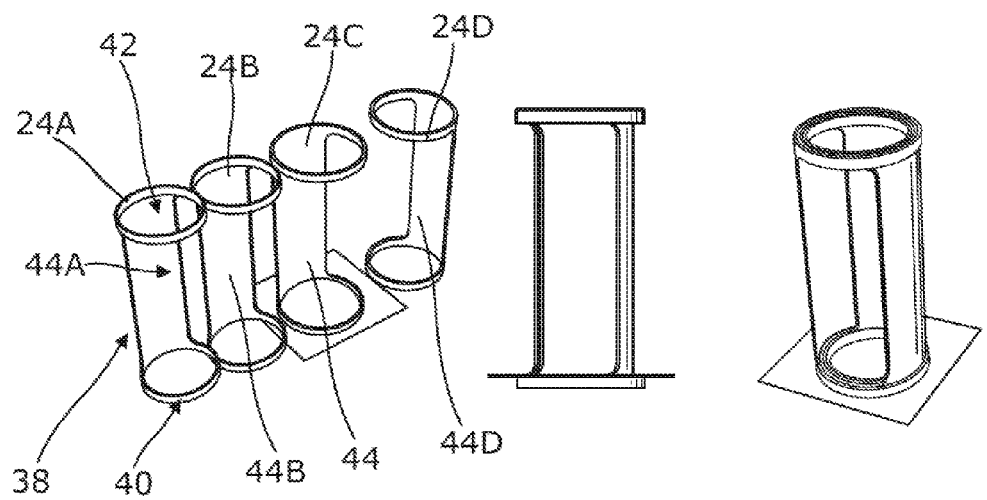
FIG. 5 is a perspective exploded view of the various parts comprising an access device according to the embodiment of FIGS. 2 to 4.

According to the embodiment illustrated in FIGS. 2 to 5, each wall 24 is in the form of an apertured cylinder 38, the cylinder 38 being fully visible in FIG. 5. The cylinder 38 is apertured to form two lower 40 and upper 42 integral rings and a shutter 44. Each of the rings 40 and 42 are cylindrical in shape with a circular cross-section. Each shutter 44 is a curved parallelepiped in shape. There are four walls 24, identified as 24A, 24B, 24C and 24D. The rings 40 and 42 are placed in the upper grooves 30 in the ceiling and in the lower grooves in the floor so that the upper edge of the lower ring 40 is flush with the floor surface and so that the lower edge of the upper ring 42 is flush with the surface of the ceiling. The floor and the ceiling of the cabin are adapted to allow this. In this manner, the rings 40 and 42 are not visible in the cabin. Only the shutter 44 appears. Each of the shutters 44A, 44B, 44C and 44D extend over an angular sector of 90° (or slightly a few more degrees which is made possible due to the fact that each shutter is in its own guide track, separate from other shutters) so as to completely close off the interior volume in security vestibule position 32 when each of the longitudinal ends of the shutters 44 adjoin the longitudinal end of another shutter 44 (or the closure wall 36) and also free up the space occupied by the shutters 44 in security vestibule position in the cabin, by overlapping at least in twos said shutters 44 at the openings provided 10 and/or 18.

Each groove 30 comprises wall 24 moving systems of known type. According to an exemplary system, the rings 40 and 42 can be moved by means of bearing, guide and/or safety rollers located inside grooves 30. The bearing rollers provided at floor level support the wall to which they are associated and ensure mobility thereof along the groove. The guide rollers at ceiling level have the same functions as the bearing rollers except for support as they are positioned on the upper rings 42. The safety rollers function in the event of negative accelerations. Locking and movement control devices of known type are also provided. The locking systems can lock the walls in relation to their fixed environment or in relation to the other walls. It is also possible to add devices for discharging particles such as dusts, fibers, miscellaneous debris or other types likely to disrupt the operation of the systems installed. Such devices are also of known type and thus will not be described in further detail. They may be, for example, in the form of bristles, brushes or the like arranged on either side of the bearing and guide rollers or even suction systems.

The walls 24 are made of a material offering a good compromise between stiffness and lightness. They are, for example, made of composite sandwich materials, and more particularly are carbon/Nomex-based®, the carbon structure being made by stacking thin layers of structural carbon fibers (0.13 millimeters for example) (carbon of conventional thickness between 25 and 30 millimeters) inside of which is provided a Nomex central core.

All or only certain parts of the access device may be armored. The armoring is achieved, for example, by applying a thin layer of bulletproof sheet metal.

All other embodiments different from that shown above are possible.

Thus, for example, the access device may include three mobile shutters with an angular sector of 120° or slightly more by a few degrees, or a larger number of shutters of smaller angular sector.

According to another example, the walls 24 can be in a curved parallelepiped shape. The embodiment illustrated in which a wall consists of an integral apertured cylinder improves the stiffness of the wall and facilitates mobility thereof: improved stiffness avoids all bending which could lead to blocking of the device. The rings offer closed geometries that provide easy rotational mobility. Stiffness plays an important role in the dynamic aspect, namely mobility, rotation, etc., as well as in the security aspect which is the primary function of the access device. The access device must protect an individual from any external aggression when passing from one area to another.

The access device can be operated manually or automatically. In the case of manual control, a person in the cabin must unlock/lock the shutters in order to deploy the security vestibule. So if someone in the cockpit wants a secure access, the person must contact a member of the cabin crew securely via radio or other means to request that the security vestibule be installed. Additional visual means such as cameras can allow viewing of the area in question so as to ensure the security vestibule is properly installed. In the case of automatic control, the installation of the security vestibule can be triggered from the cabin and/or from the cockpit. Here again, for the persons in the cockpit, the system can include means for viewing the area in question.

FIGS. 6a to 6d represent four states of the access device 1 when it is used in the environment described in more detail below.

As shown in FIGS. 6a to 6d, the aircraft equipped with the access device 1 is a single-aisle aircraft. The center aisle 20 is located on the same central longitudinal axis as the opening 10 allowing passage between the cockpit 2 and the cabin 6. Toilet facilities 16 are positioned against the partition 8 and on the same side of the aisle 20, and in this case, the left side of the longitudinal axis X-X facing the cockpit 2 inside the cabin 6. The toilet facilities 16 are provided with an opening 18 allowing access between the toilet facilities 16 and the cabin 6. One of the rows 12'A of passenger seats is located near the toilet facilities 16 and one of the rows 12'B is located near the partition 8.

The access device is positioned so as to control passages at the openings of the cockpit 10 and the toilet facilities 18. It is therefore located at the intersection of passages provided between the cockpit 2, the toilet facilities 16 and the cabin 6. The size of the shutters 44 is determined so that the shutter(s) intended to close off the passage between the cabin and the cockpit and/or between the cabin and the toilet facilities block(s) the opening 10 and/or 18. As the shutter 44 is curved, its edges protrude in relation to the flat surface of the partitions in which the openings 10 and 18 are made.

In non-secure usage conditions, the access device 1 is retracted. The security vestibule, used only in the event of secure access, is not visible and the space in front of the openings 16 of the toilet facilities and cockpit 10 remains unobstructed. The access to the toilet facilities and cockpit is thus conventional apart from the fact that the doors are mobile along guide tracks 30.

Figure 6A:
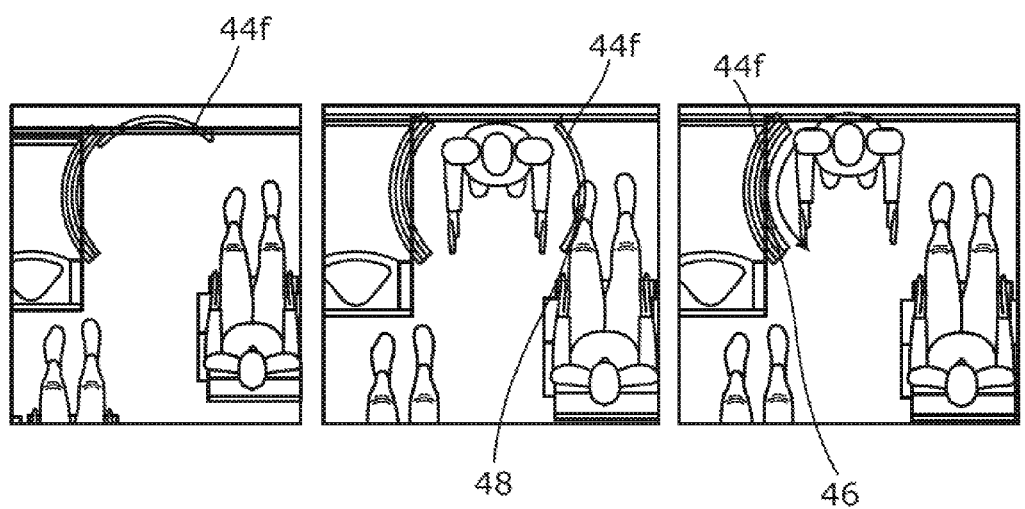
FIGS. 6a to 6d are schematic top views of positions of use of an embodiment of the access device illustrated in FIGS. 2 to 5 integrated in an aircraft.

FIG. 6a represents the use of the access device 1 for non-secure control of the passage between the cockpit 2 and the cabin 6 for a pilot or a stewardess, for example. One of the shutters 44 is in the form illustrated furthest on the inside, referred to below as the closure shutter 44f, moves to mask or free up the opening 10. The three other shutters are all positioned at the opening 18 of the toilet facilities. In this manner, the toilet facilities are closed so as not to be visible by passengers sitting in the seats of row 12'B. In addition, none of the shutters is located in the cabin 6 and more particularly in the space located near the two openings 10 and 18. The passengers at the end of rows 12'A and 12'B experience no discomfort whatsoever. The shutter 44f can be moved in two different directions to free up the opening 18. Depending on the direction, the shutter is locked in two different positions 46 and 48. In position 46, the shutter 44f overlaps the three other shutters 44 at the opening 18 of the toilet facilities. In this configuration, the passage between the cockpit 2 and the cabin 6 is freed up without taking up cabin space. In position 48, the shutter 44f is opposite the opening 18 and is in the embodiment illustrated in a position diametrally opposite that of the three other shutters; it thus protects the access to the cockpit by the passenger located at the end of the row 12'B. Once the passage is no longer desired, the shutter 44f returns to the cockpit closure position.

Figure 6B:
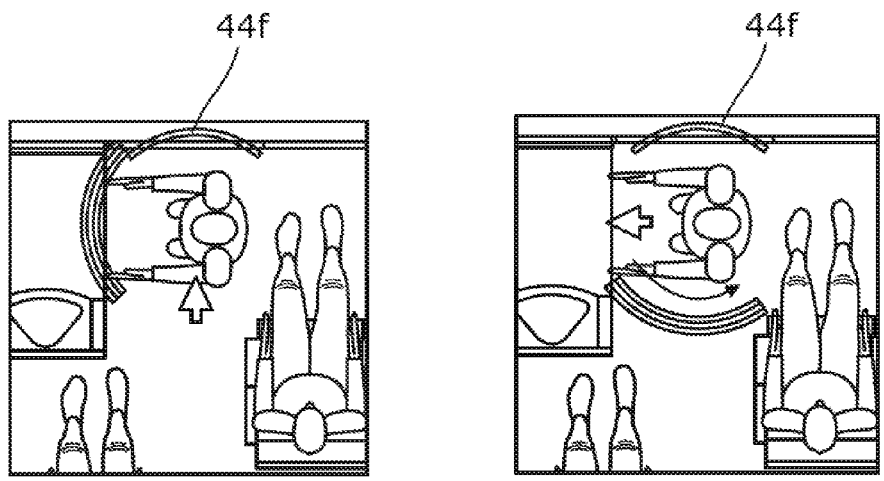

FIG. 6b represents the use of the access device 1 for non-secure control of the passage between the cabin 6 and the toilet facilities 16. The shutter 44f is positioned so as to block the passage between the cabin 6 and the cockpit 2. In order to provide those individuals (passengers, pilot, stewardess) requiring access to the toilet facilities, the three remaining shutters 44 are moved to be blocked in a position opposite the opening 10, and in the embodiment illustrated, diametrally opposite the position held by the shutter 44f. The access is then freed and the three shutters are able to temporarily conceal the person requiring access to the toilet facilities from the rest of the cabin 6 since the three shutters are positioned in the center aisle 20. Once the person is in the toilet facilities, the three shutters return to the toilet facilities closure position and the cabin space is freed up. To exit the toilet facilities 16, the same operations are repeated.

Figure 6C:
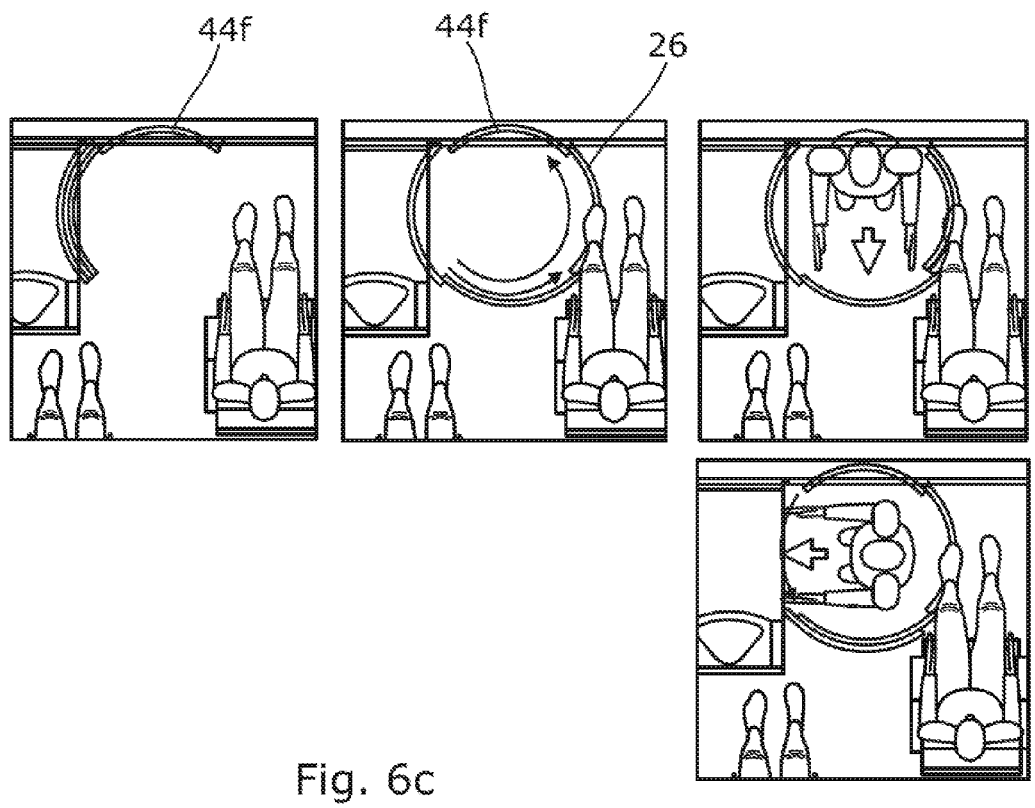

FIG. 6c represents the use of the access device 1 in a secure manner to allow the pilot or any other person in the cockpit to access the toilet facilities 16, while being protected from any possible aggression by someone in the cabin. As shown in FIG. 6c, the shutters 44 are deployed to occupy the security vestibule position 32 and form a cylinder 26 closed off by means of the wall 36. The shutter 44f is then moved to be locked in a position opposite the opening 18 of the toilet facilities and in the embodiment illustrated in a position diametrally opposite that held by the shutter masking the opening 18 of the toilet facilities. The pilot can then enter the security vestibule formed by the cylinder 26 whose access is freed up by the movement of the shutter 44f. The shutter 44f then returns to the closed position of the cockpit to prevent intrusion into the cockpit by someone possibly hiding in the toilet facilities, for example. The shutter blocking the opening 18 is then moved to overlap the adjacent shutter located opposite the opening 10 (and in the embodiment illustrated diametrally opposite the shutter 44f closing off the opening 10). The pilot can then access the toilet facilities. The shutter in question returns to the toilet facilities closure position. Two options are thus possible: the security vestibule remains in position or it retracts and redeploys when the pilot wants to return to the cockpit. To return to the cockpit, the operations take place in reverse order. The present invention thus offers a completely secure solution for access between the cockpit and the toilet facilities while avoiding a cumbersome system in the cabin.

Figure 6D:
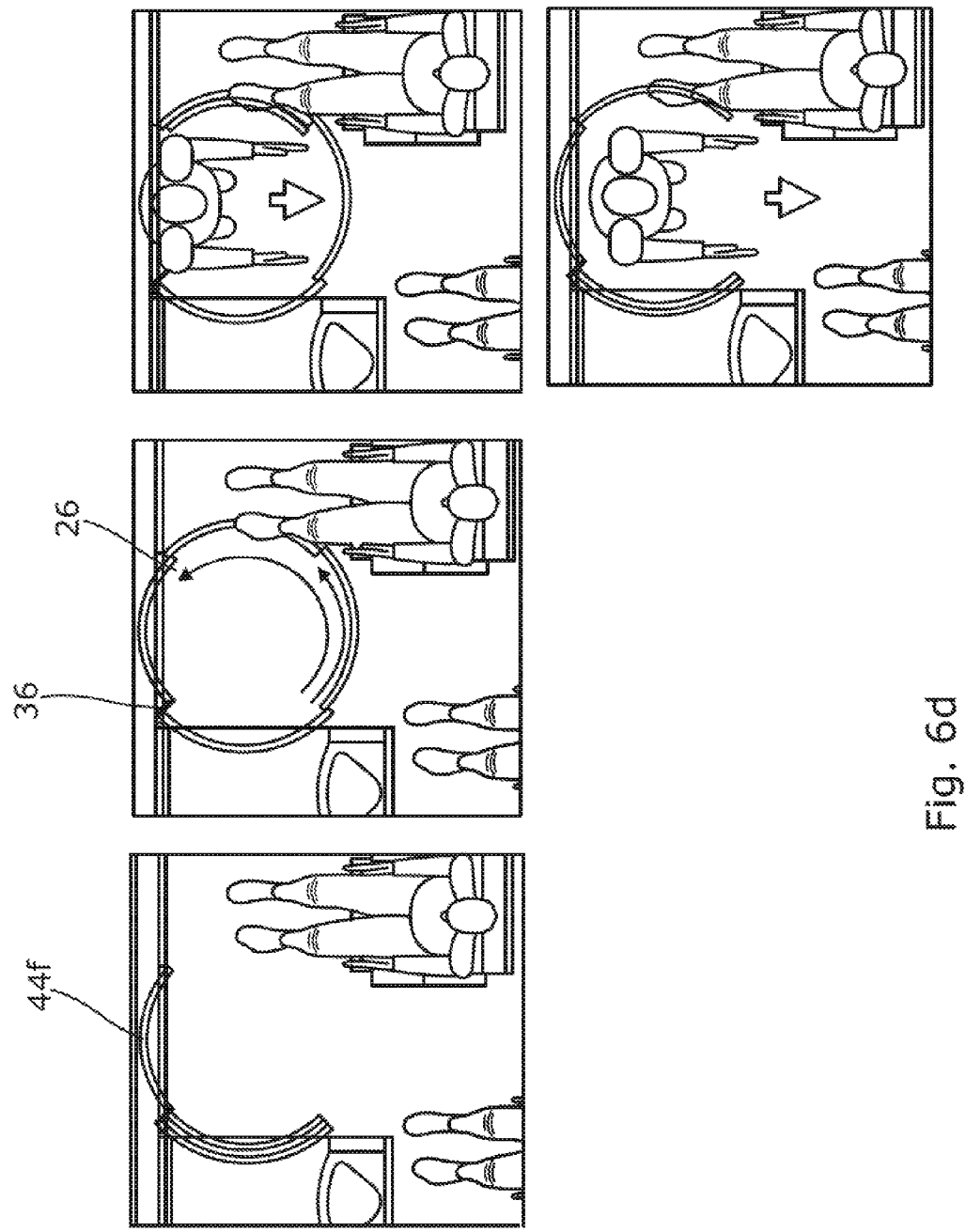

FIG. 6d represents the use of the access device 1 in a secure manner to allow the pilot or any other person in the cockpit to access the cabin or a stewardess or any other person in the cabin access to the cockpit 2, while being protected from any possible aggression by someone in the cabin. As shown in FIG. 6d, in the case where someone in the cockpit wants to access the cabin or in the case where someone in the cabin wants to access the cockpit in a secure manner, the shutters 44 are deployed to the security vestibule position 32 and to form a closed cylinder 26. In the case with someone in the cabin, the individual takes up position near the openings 10 and 18 so that the shutters 44 deploy around them and completely surrounds them. The shutter 44f is then moved to be locked in a position opposite the opening 18 and in the embodiment illustrated in a position diametrally opposite the position held by the shutter masking the opening 18 of the toilet facilities. The person in the cockpit can then enter the security vestibule formed by the cylinder 26 or the person in the security vestibule can exit in order to enter the cockpit. The shutter 44f then returns to the closed position of the cockpit to prevent any intrusion during the following step. In the embodiment illustrated, the shutter being opposite the opening 18 moves to free up passage to the cabin. The shutters thus return to their original positions or any other position according to the desired operation. The present invention thus offers a completely secure solution for access between the cockpit and the cabin while avoiding a cumbersome system in the cabin.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An access device enabling secure communication between at least two areas of an enclosure, the access device comprising:
   at least first, second, and third mobile walls configured to move, independently from one another, to form a closed cylinder, the walls thus being in a security vestibule position, and to overlap at least in twos to close off access to one or more areas while concealing the security vestibule, the walls thus being in a retracted position.

2. The access device as claimed in claim 1, wherein each of the mobile walls is made of a single piece.

3. The access device as claimed in claim 1, wherein each of the mobile walls has an apertured circular cylindrical shape and the mobile walls are positioned in a concentric manner about a common axis.

4. The access device as claimed in claim 1, further comprising a fourth apertured cylindrical wall and each of the walls forming a shutter, each of the walls of circular cross-section concentric about a common axis such as in the security vestibule position, the shutters together form a closed circular cylinder and in another retracted position, the shutters overlap at least in twos.

5. The access device as claimed in claim 1, wherein each wall is connected to retaining and rotational movement means independent from retaining and rotational movement means provided for each other wall.

6. The access device as claimed in claim 5, wherein each wall has two cylindrical rings to stiffen a structure thereof and form the link with the retaining and movement means.

7. The access device as claimed in claim 5, wherein the retaining and movement means of each of the walls are such that they do not protrude in relation to a floor.

8. An aircraft comprising at least first and second areas provided with access openings configured to be closed by the walls of an access device enabling secure communication between the two areas, the access device comprising:
   at least first, second, and third mobile walls configured to move, independently from one another, to form a closed cylinder, the walls thus being in a security vestibule position, and to overlap at least in twos to close off access to one or more areas while concealing the security vestibule, the walls thus being in a retracted position.

9. The aircraft as claimed in claim 8, wherein one of the first and second areas is the cockpit, another of the first and second areas is the cabin, and wherein the walls overlap to form a cockpit closure shutter and completely free up the cabin.

10. The aircraft as claimed in claim 9, wherein another of the first and second areas is the toilet facilities, and wherein the walls are configured to close off the access to the toilet facilities and simultaneously close off the access to the cockpit while completely freeing up the cabin.

\* \* \* \* \*